Figure 1:
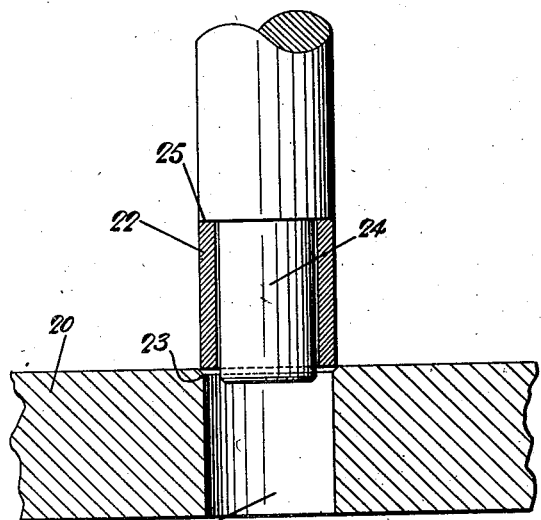

July 3, 1928.

A. H. VALENTINE 1,676,171

METHOD OF INSERTING BEARINGS IN BEARING RECESSES

Filed Dec. 15, 1925

Inventor
Albert H. Valentine
By Spencer Suvall and Hardman
his Attorneys

Patented July 3, 1928.

1,676,171

UNITED STATES PATENT OFFICE.

ALBERT H. VALENTINE, OF DAYTON, OHIO, ASSIGNOR TO MORAINE PRODUCTS COMPANY, OF DAYTON, OHIO, A CORPORATION OF OHIO.

METHOD OF INSERTING BEARINGS IN BEARING RECESSES.

Application filed December 15, 1925. Serial No. 75,580.

This invention relates to shaft bearings and particularly to bushings of porous metal which are adapted to be pressed into bearing recesses in machine frames.

Porous bearings are not easily machinable and cannot be brought to a desired size by conventional machining operations such as reaming except with considerable difficulty. Because of its porosity, a reduction of inside diameter generally occurs as the bearing is pressed into place. This is, in amount, and for a given wall thickness, generally proportional to the difference between the inside diameter of the hole in which the bearing is pressed and the outside diameter of the bearing. Due to the necessity of allowing some variation in the sizing of the hole into which the bearing is pressed, and of the outside and inside diameters of the bearing, some means must be provided to eliminate the difference in inside diameter of the bearing when pressed into place.

One of the objects of the present invention is to introduce a bearing bushing into a recess of bearing support in a manner such that no further machining of the bearing is required to adapt it for the shaft which it is intended to support, and such that the bushing will adapt itself to a recess, the diameter of which varies slightly from the prescribed dimension.

Further objects and advantages of the present invention will be apparent from the following description, reference being had to the accompanying drawings wherein a preferred form of embodiment of the present invention is clearly shown.

Figure 2:
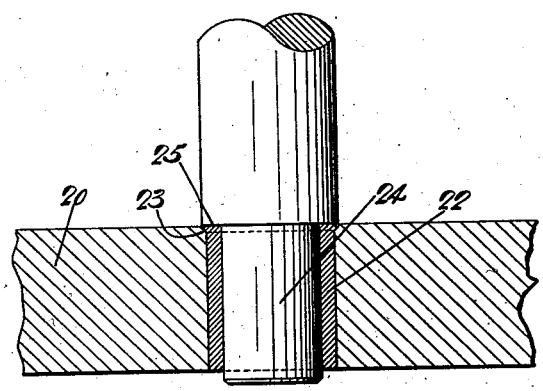

In the drawings:

Figs. 1 and 2 are fragmentary views partly in section showing in two positions of operation the apparatus for carrying out the present invention.

The type of porous metal bearing for which the present invention is particularly adapted is manufactured by briquetting a mixture of metallic powders and void forming ingredients, and sintering the briquettes in a non-oxidizing atmosphere. The following process is an example: A mixture of 90 parts by weight of copper, 10 parts tin, 6 parts graphite and 2 parts salicylic acid, in a very finely divided state, is briquetted under high pressure into the form of a bushing suitable for bearing. The briquetting pressure is approximately 75,000 pounds per square inch. A quantity of the briquettes are heated in carbonizing or sintering boxes for three hours at approximately 1425° F. After removal from the sintering boxes the bushings are surfaced and sized by apparatus including concentric arbor and die members which squeeze the material of the bushing into a true cylindrical tubular shape of certain dimensions. After being sized the bushings are impregnated with lubricant by soaking them for one and one-half hours in oil having a paraffin base and heated to a temperature of 250° F.

In order to adapt the bushings to be received by bearing recesses of certain dimensions and to receive a shaft of a certain diameter, the outside diameter of the bushing is initially greater than the diameter of the bearing recess by an amount required for press fitting the bushing into the recess. The inside diameter of the bushing is initially greater than the diameter of the shaft which is to be supported by the bushing. The difference between the initial inside diameter of the bushing and the diameter of the bushing after being installed in a machine frame is preferably less than the difference between the initial outside diameter of the bushing and the diameter of the recess which receives the bushing. The ratio of the last mentioned diameter difference to the first mentioned diameter difference will decrease as the wall thickness of the bearing is increased. For example, for a $\frac{3}{32}$ inch bearing wall, a ratio of .6 has been found satisfactory; and for $\frac{1}{8}$ inch wall a ratio of .5.

Numeral 20 in the drawings indicates a bearing support having a bearing recess 21 which is beveled at 23 to assist entering the bushing within the recess. The bushing 22 is placed upon the beveled portion 23, and the reduced end of portion 24 of an arbor or mandrel is inserted within the bushing as shown in Fig. 1. The shoulder 25 of the arbor rests against the upper end of the bushing. Relative motion is produced between the bearing support 20 and the assembly of the bushing 22 and arbor 24 so that the bushing will be forced into the space between the arbor 24 and the bearing support 20 as shown in Fig. 2. The bearing is slightly reduced in volume by thus forcing it into the space between the arbor and the bearing support. Due to the porosity of the bearing material the particles of the bearing are squeezed together to a certain extent and take a substantially permanent set so that the internal diameter of the bushing does not decrease materially after the arbor is withdrawn following the operation shown in Fig. 2. Consequently the bearing will not require any machining to adapt it for receiving a shaft journal of certain size.

To illustrate the method of calculating the diameter of the arbor portion 24 and the external and internal diameters of the bushing 22, the following example is given: the bearing recess 21 is 1" in diameter and is to receive a bearing for a shaft .750" in diameter. Allowing .001" for a running fit between the shaft and the bearing after being installed in the machine frame 20, the diameter of the mandrel portion 24 will be .751". Allowing .003" for a press fit between the bushing 22 and the frame 20, the outside diameter of the bushing will be 1.003". The thickness of the bearing wall being about 1/8", the inside diameter of the bushing 22 will be initially $$(.5 \times .003) + .751'' = .7525''.$$

The present invention is adapted for use where commercial manufacturing is carried on. It is apparent that a bearing recess of a certain specified diameter will not be absolutely uniform in a substantial quantity of parts. For example, the tolerance permitted for bearing recess 1" in diameter may be plus or minus .001". It would still be practical to use a bearing bushing of the diameter specified in the example although the bearing recesses might be .999" in diameter. Owing to the porosity of the metal of which the metal is composed the present invention causes the bushing to adapt itself to these slight variations in diameter of the bearing recesses which are intended to receive identical bushing parts. From the foregoing description of one example of use of the invention it is apparent that the present method of assembling a bearing in a hole in a machine frame takes up errors in diameter of the bearing; takes up errors in the receiving hole diameter; provides a cylindrical bearing surface of slight diametral error; and insures better contact between the bearing outside surface and the surface of the hole in which it is placed.

Due to its porosity, the bushing does not elongate as it is squeezed between the machine frame and the mandrel; therefore, there is no sliding of the bearing material relative to the mandrel and no burnishing of the interior surface of the bushing. Hence this process does not cause the pores of the bearing bushing to be closed so that the lubricant within the bearing could not flow to the bearing surface. Withdrawal of the mandrel after installing the bushing does not produce appreciable burnishing of its bearing surface.

While the form of embodiment of the present invention as herein disclosed constitutes a preferred form, it is to be understood that other forms might be adopted, all coming within the scope of the claims which follow.

What is claimed is as follows:

1. The method of providing the cylindrical recess of a bearing support with a lining of bearing material, which consists in forming a tubular porous metal bearing having an outside diameter greater than the diameter of the recess for receiving the bearing and having an inside diameter greater than is necessary for proper running clearance for the shaft journal which is to be received by the bearing; in assembling the bearing tube upon a mandrel having a diameter substantially equal to the diameter of the required shaft journal; and in producing relative movement between the bearing support and the assembled bearing tube and mandrel in order to press fit the tube within the recess of the bearing support and to reduce the diameter of the bearing tube to that of the mandrel.

2. The method of providing a cylindrical recess of a bearing support with a lining of bearing material, which consists in forming a tubular porous metal bearing having an outside diameter which exceeds the diameter of the recess by an amount required to produce a press fit between the bearing tube and the wall of said recess, and having an inside diameter exceeding the diameter of the required shaft journal to be received by the bearing by a fraction less than one of the said excess amount required for press-fit; in assembling the bearing tube upon a mandrel having a diameter substantially equal to the diameter of the required shaft journal; and in producing relative movement between the bearing support and the assembled bearing tube and mandrel in order to press fit the tube within the recess of the bearing support and to reduce the diameter of the bearing tube to that of the mandrel.

3. The method of providing a cylindrical recess of a bearing support with a lining of bearing material, which consists in forming a tubular porous metal bearing having an outside diameter which exceeds the diameter of the recess by an amount required to produce a press fit between the bearing tube and the wall of said recess, and having an inside diameter exceeding the diameter of the shaft journal to be received by the bearing, the ratio of the diameter difference between the initial internal diameter of the bearing and the diameter of the shaft journal to the diameter difference between the initial external diameter of the bearing and the diameter of the recess being less than one and decreasing as the bearing wall thickness is increased; in assembling the bearing tube upon a mandrel having a diameter substantially equal to the diameter of said shaft journal; and in producing relative movement between the bearing support and the assembled bearing tube and mandrel in order to press fit the tube within the recess of the bearing support and to reduce the diameter of the bearing tube to that of the mandrel.

In testimony whereof I hereto affix my signature.

ALBERT H. VALENTINE.